United States Patent [19]
Suzuki et al.

[11] Patent Number: 4,747,382
[45] Date of Patent: May 31, 1988

[54] IGNITION TIMING CONTROL SYSTEM FOR INTERNAL COMBUSTION ENGINES

[75] Inventors: Yoshio Suzuki, Wakoh; Shigehiro Kimura, Niiza, both of Japan

[73] Assignee: Honda Giken Kogyo Kabushiki Kaisha, Tokyo, Japan

[21] Appl. No.: 865,625

[22] Filed: May 21, 1986

[30] Foreign Application Priority Data

May 27, 1985 [JP] Japan ................................ 60-113761

[51] Int. Cl.$^4$ .................................................. F02P 5/04
[52] U.S. Cl. ..................................... 123/418; 123/414; 123/617
[58] Field of Search ............... 123/414, 617, 488, 494, 123/418

[56] References Cited

U.S. PATENT DOCUMENTS

| 4,280,461 | 7/1981 | Okuda | 123/414 |
| 4,475,526 | 10/1984 | Schleupen | 123/414 |
| 4,487,059 | 12/1984 | Fischer | 123/414 |
| 4,584,978 | 4/1986 | Sasaki | 123/414 |

Primary Examiner—Ronald B. Cox
Attorney, Agent, or Firm—Lyon & Lyon

[57] ABSTRACT

An ignition timing control system for an internal combustion engine comprises magnetic pick-up means for magnetically sensing the angular position of the crankshaft and for generating an output signal indicative thereof, control means for controlling the ignition timing of the engine based on the output signal from the magnetic pick-up means, and correction means for correcting the ignition timing to be controlled by the control means for a delay in the generation of the output signal, which delay increases with a rise in the rotational speed of the engine.

5 Claims, 4 Drawing Sheets

ENGINE ROTATIONAL SPEED

IGNITION TIMING CONTROL SYSTEM FOR INTERNAL COMBUSTION ENGINES

BACKGROUND OF THE INVENTION

This invention relates to an ignition timing control system for internal combustion engines, and more particularly to an ignition timing control system for controlling ignition timing on the basis of a signal indicative of the crank angle position of a crankshaft sensed by a magnetic pick-up.

In controlling the ignition timing of an internal combustion engine, a mixture supplied to the engine is ignited through a procedure which generally includes sensing predetermined crank angle positions of the engine crankshaft, calculating ignition timing conforming to engine operating conditions with reference to each of the predetermined crank angle positions, generating an ignition command signal based on the calculated ignition timing, and terminating supply of a pulse of electric current to the primary side of the ignition coil upon generation of the ignition command signal to cause generation of a high-voltage on the secondary side of the ignition coil, and thereby produce a spark discharge at a spark plug of the engine.

In order to ignite the mixture supplied to the engine precisely at the desired crank angle position, an ignition timing control system such as disclosed in Japanese Provisional Utility Model Publication (Kokai) No. 55-163476 is adapted to correct the ignition timing for a delay in time between the moment the ignition command signal is generated for the ignition coil and the moment the spark discharge is actually produced at the spark plug. However, in an arrangement which uses a sensor such as a magnetic pick-up to magnetically sense the crank angle position of the crankshaft in the ignition procedure described above, it is also necessary to take into account a time delay involved in the generation of the sensor output signal. Though this time delay can be shortened or substantially eliminated by employing a sensor that senses the crank angle position by optical means, such a sensor is high in cost and involves peripheral circuitry of some complexity.

SUMMARY OF THE INVENTION

It is therefore an object of the invention to provide an ignition timing control system for an internal combustion engine, wherein ignition is achieved precisely at the optimum ignition timing even if the system uses a magnetic pick-up to sense the crank angle position of the engine crankshaft.

According to the invention, the foregoing object is attained by providing an ignition timing control system for an internal combustion engine comprising: magnetic pick-up means for magnetically sensing a crank angle position of the crankshaft and for generating an output signal indicative thereof; control means for controlling the ignition timing of the engine based on the output signal from the magnetic pick-up means; and correction means for correcting the ignition timing to be controlled by the control means for a delay in the generation of the output signal, which delay increases with a rise in the rotational speed of the engine.

Thus, even if the magnetic pick-up means generates an output signal after a time delay, the ignition timing is corrected in dependence upon the rotational speed of the engine to enable the mixture to be ignited precisely at the desired crank angle position.

The above and other objects, features and advantages of the invention will be more apparent from the following description taken in conjunction with the accompanying drawings, in which like reference characters designate the same or similar elements or parts throughout the figures thereof.

DETAILED DESCRIPTION

A preferred embodiment of an ignition timing control system for an internal combustion engine according to the invention will now be described with reference to FIGS. 1 through 5.

Figure 1:
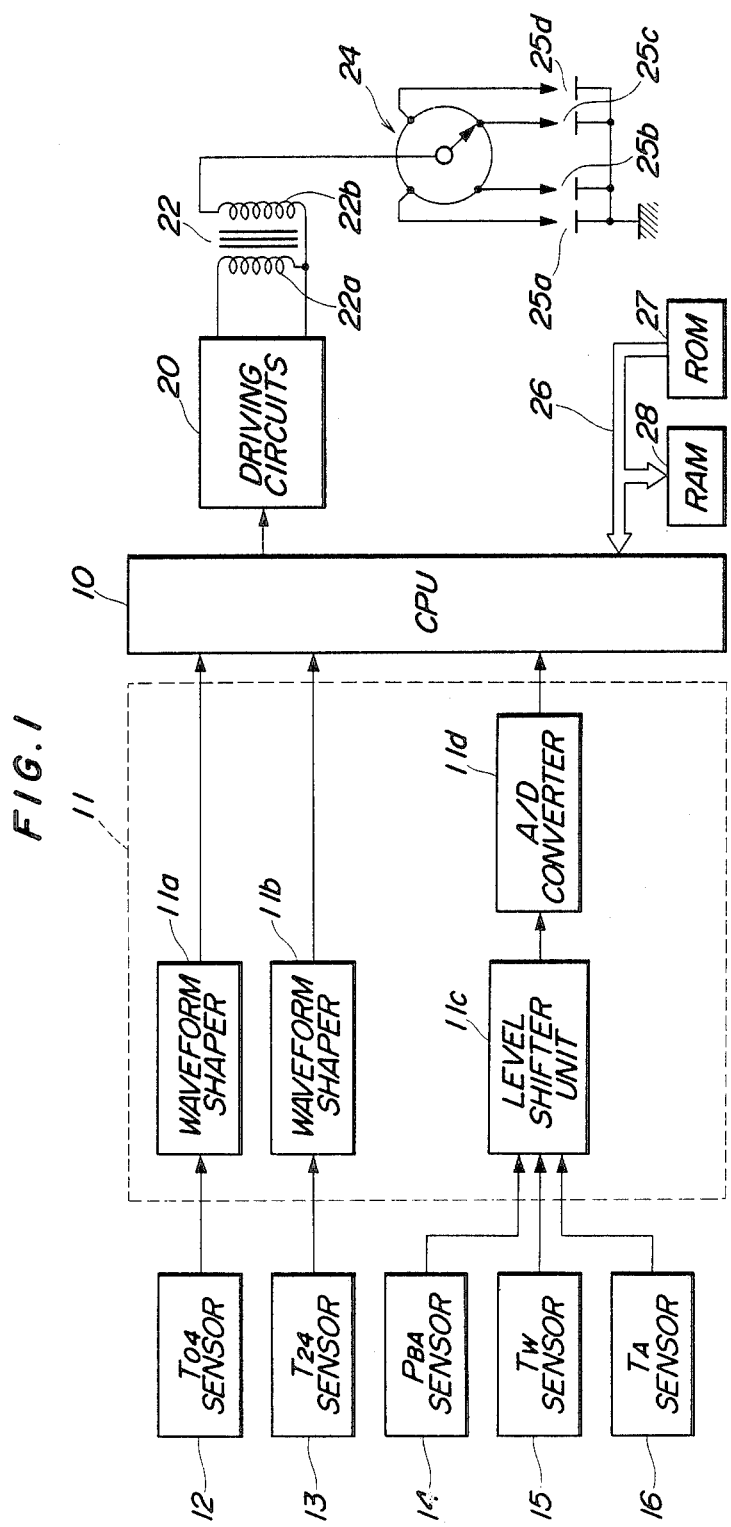
FIG. 1 is a block diagram illustrating the overall construction of an ignition timing control system for an internal combustion engine to which the present invention is applied.

FIG. 1 illustrates the overall construction of an ignition timing control system to which the present invention is applied. The illustrated ignition timing control system is for controlling the ignition timing of a four-cylinder internal combustion engine and includes a central processing unit (hereafter referred to as "CPU") 10 having an input side to which sensors for sensing various parameters are connected via an input circuit 11. These sensors include a T04 sensor 12 arranged in facing relation, for example, to an engine camshaft 1 (FIG. 3) for generating a T04 signal pulse indicative of a reference crank angle position of each engine cylinder immediately before the top dead center (TDC) position at the end of the compression stroke of each cylinder and at a predetermined crank angle position of, for example, 10° before TDC (referred to as "BTDC"). The T04 sensor 12 is connected to the CPU 10 through a waveform shaping circuit 11a in the input circuit 11.

Figure 2:
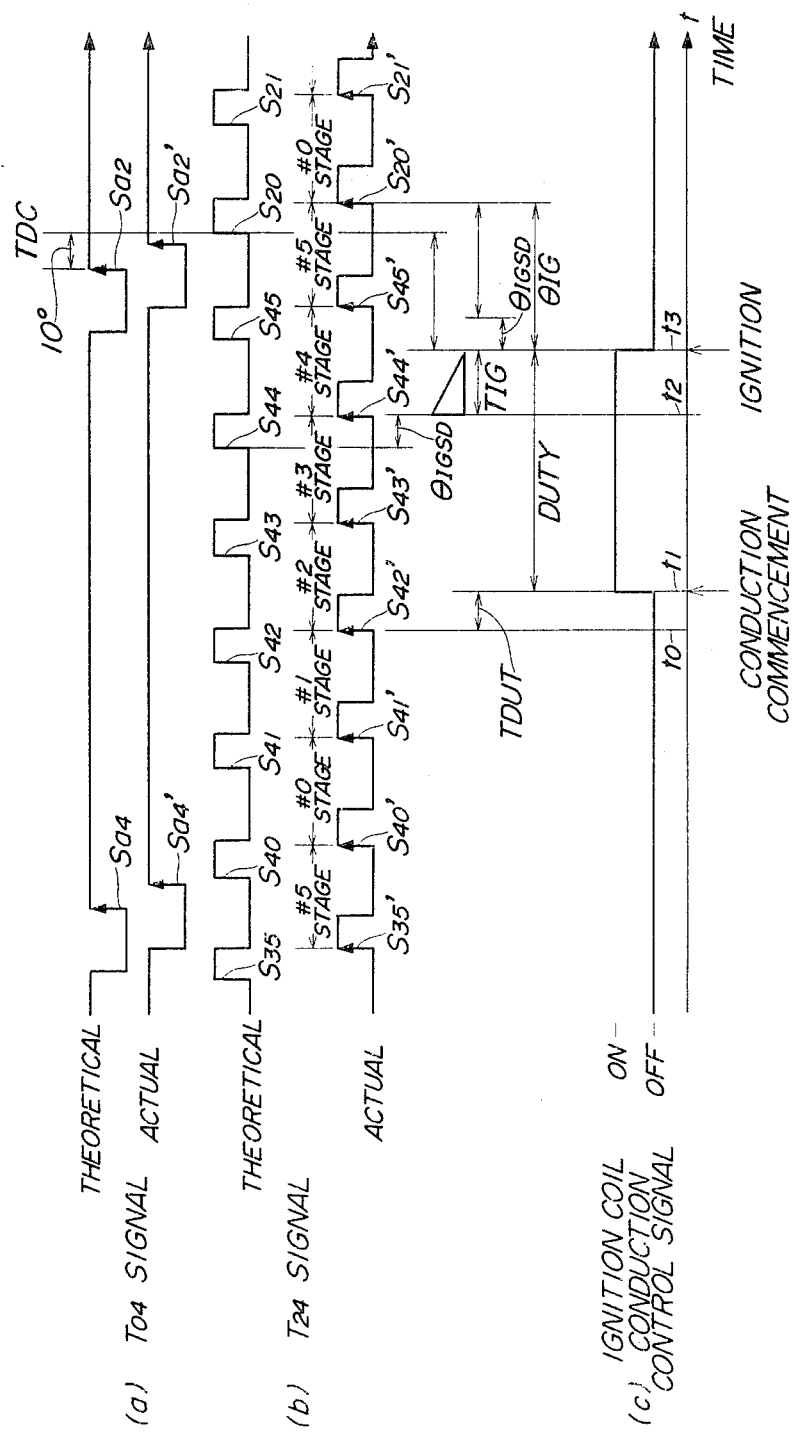
FIG. 2 is a timing chart illustrating temporal changes in the generation of T04 and T24 signals generated by respective T04 and T24 sensors and an ignition coil conduction control signal.
Figure 3:
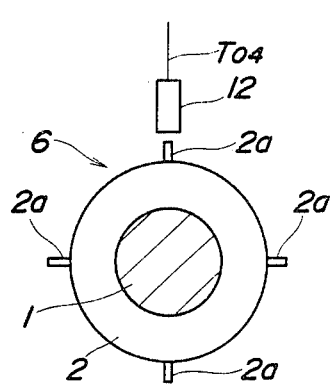
FIG. 3 is a schematic view showing the manner in which the T04 sensor is arranged.

The manner in which the T04 sensor 12 is arranged is illustrated in FIG. 3. The camshaft 1, which revolves once per engine cycle, i.e., for every two revolutions of the crankshaft, has a rotor 2 fixedly secured thereto. The rotor 2 is provided with a plurality of equiangularly spaced projections 2a of prescribed width extending radially outwardly. One projection 2a is furnished for each cylinder of the internal combustion engine, so that four of these projections 2a, spaced apart by 90° are provided on the rotor 2 for an engine having four cylinders. The T04 sensor 12 comprises a magnetic pick-up coil and is disposed at a position radially outward of the rotor 2 where it can confront each projection 2a across a small gap. The T04 sensor 12 generates a T04 signal pulse each time one of the projections 2a is caused to confront the sensor by rotation of the camshaft. The pulse is applied to the waveform shaping circuit 11a shown in FIG. 1. The waveform shaping circuit 11a shapes the T04 signal pulses from the T04 sensor 12 into rectangular pulses Sa4, Sa2, shown in (a) of FIG. 2, which are applied to the CPU 10.

Figure 6:
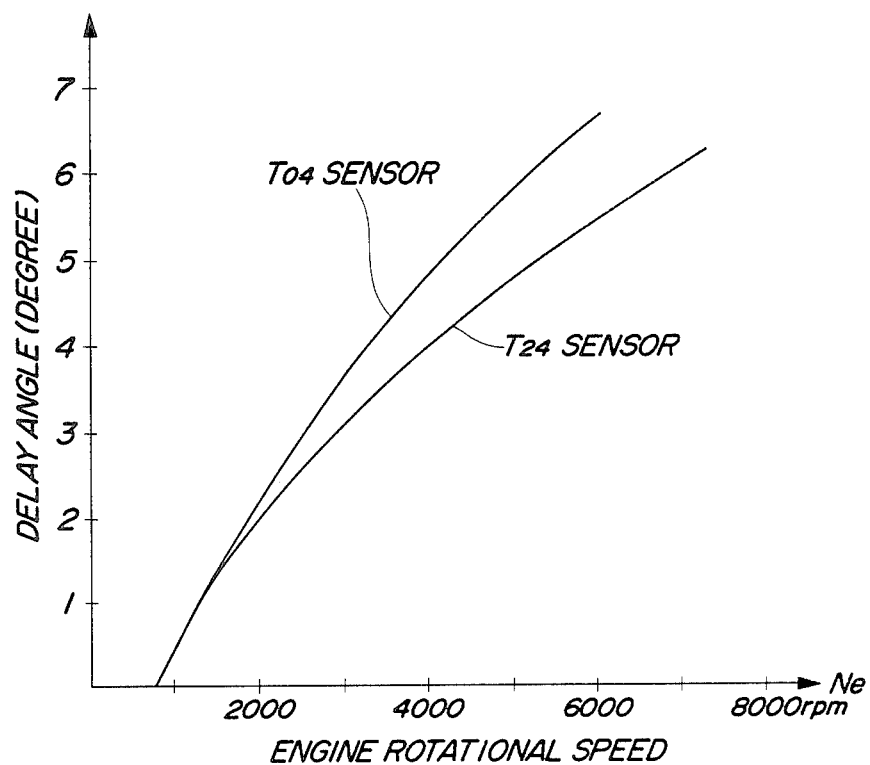
FIG. 6 is a graph showing the relationship between the rotational speed Ne of the engine and time delay in the generation of outputs of T04 and T24 sensors.

As the rotational speed of the rotor 2, namely the rotational speed (rpm) Ne of the engine rises, the pulses magnetically generated by the T04 sensor 12 occur at a time which lags increasingly behind that at which the projections 2a come into confrontation with the T04 sensor 12. This time delay involved in the generation of these pulses can be expressed in terms of a delay angle $\theta$IGSD which, as shown in FIG. 6, increases with a rise in the rotational speed of the engine. Therefore, in theory (namely where the delay in pulse generation is nil), the positive-going transition of, for example, the pulse Sa2 represents a predetermined crank angle (e.g. 10°) before TDC at the end of the compression stroke of the second cylinder. In actuality, however, the T04 sensor 12 produces a pulse Sa2' whose positive-going transition occurs at a crank angle position shifted from the point 10° BTDC of the second cylinder by a delay angle the magnitude whereof corresponds to the engine rotational speed Ne.

A T24 sensor 13 which, like the T04 sensor 12, comprises a magnetic pick-up and is arranged in facing relation to the camshaft 1, is adapted to generate 24 equally spaced pulses (i.e., pulses produced at a 30° interval in terms of the crank angle) at predetermined crank angle positions during one full revolution of the camshaft, namely two full revolutions of the crankshaft, which is not shown. The T24 sensor 13 is connected to the CPU 10 via a waveform shaping circuit 11b, whereby the T24 signal pulses [pulses S35', S40'- S45', S20' . . .) are shaped before being applied to the CPU 10. Like the T04 signal pulses, these T24 signal pulses are also displaced from the theoretical crank angle position by a delay angle $\theta$IGSD which also increases with a rise in the rotational speed Ne of the engine as shown in FIG. 6.

The remaining sensors include an absolute pressure (PBA) sensor 14 for sensing absolute pressure PBA in an intake pipe downstream of the engine throttle valve, neither of which are shown, an engine coolant temperature (TW) sensor 15 mounted in the peripheral wall of a cylinder filled with engine cooling water or coolant for sensing the coolant temperature TW, and an intake air temperature (TA) sensor 16 for sensing intake air temperature TA in the intake pipe. These sensors 14, 15, 16 are connected to the CPU 10 via a level shifter unit 11c and an A/D converter 11d of the input circuit 11. The absolute pressure sensor 14, engine coolant temperature sensor 15 and intake air temperature sensor 16 produce analog output signals each of which is shifted to a predetermined voltage level by the level shifter unit 11c. Each analog signal so shifted is then converted into a digital signal by the A/D converter 11d before being fed into the CPU 10.

Connected to the output side of the CPU 10 is a driving circuit 20 for supplying a primary coil 22a of an ignition coil 22 with coil excitation power. The ignition coil 22 has a secondary coil 22b connected to spark plugs 25a-25d of respective cylinders via a distributor 24.

Also connected to the CPU 10 via a bus 26 are a ROM 27 storing an operational program and the like, and a RAM 28 for temporarily storing the results of calculations executed by the CPU 10 in accordance with the operational program, as well as other data.

Reference is made to FIG. 2 to describe the operation of the ignition timing control system constructed as set forth above.

On the basis of the T04 signal from the T04 sensor 12 and the T24 signal from the T24 sensor 13, the CPU 10 senses crank angle stages (hereafter referred to simply as the "stage positions") located between the reference crank angle position of each cylinder of the engine which is reached immediately before completion of a compression stroke and the reference crank angle position of the next cylinder within which spark ignition should be effected. More specifically, if the T24 signal pulses S40' and S20' [(b) of FIG. 2] sensed immediately after the T04 signal pulses Sa4', Sa2' of (a) of FIG. 2 are generated, respectively, are assumed to be generated at the TDC position at the end of the compression stroke of the fourth and second cylinders of the engine, respectively, then, the CPU 10, in response to generation of the T04 signal pulse Sa4', will sense the reference crank angle position of the fourth cylinder, and, in response to the T24 signal pulse S40' immediately following the generation of the T04 signal pulse Sa4', will sense a #0 stage position. The time period between the leading edge of the T24 signal pulse S40' (which is generated at the TDC position in the illustrated embodiment) and the leading edge of the T24 signal pulse S41' in (b) of FIG. 2 is defined as the #0 stage position mentioned above. The other stage positions #1 - #5 are likewise defined. The CPU 10 proceeds to sense a #1 stage position, a #2 stage position and so on in response to the T24 signal pulses S41', S42'. . . , respectively, applied thereto.

Upon sensing a predetermined stage position (e.g. the #1 stage position), the CPU 10 performs computations based on the output signals from the parameter sensors 12 through 16 to determine an ignition timing or advance angle $\theta$IG, an ignition coil conduction time DUTY and other required quantities. The ignition advance angle $\theta$IG is computed by the use of the following equation:

$$\theta IG = \theta MAP + \theta IGCR + \theta IGSD \quad (1)$$

The ignition advance angle $\theta$IG is expressed in terms of the crank angle before a crank angle position, e.g. TDC position, at which a T24 signal pulse, e.g. S20' in (b) of FIG. 2 is generated immediately after a T04 signal pulse, e.g. Sa2' [FIG. 2(a)] indicative of the reference crank angle position of a cylinder, e.g. the second cylinder, within which ignition should be effected. $\theta$MAP represents a basic ignition timing or ignition advance angle which is determined as a function of engine rotational speed (rpm) Ne and a parameter representing engine load, such as absolute pressure PBA within the intake pipe. More specifically, a value commensurate with the sensed value PBA of absolute pressure and the sensed value Ne of engine rpm is read as the value of $\theta$MAP from an Ne-PBA-$\theta$IG map stored in the ROM 27. It should be noted that the engine rpm Ne is calculated by the CPU 10 each time a pulse in the T24 signal is applied thereto. The technique used is to calculate Ne as the reciprocal of a value Me, which is obtained by counting a number of pulses of a predetermined clock produced during the pulse generation interval of the T24 signal. $\theta$IGCR represents a first advance angle correction variable determined by such factors as engine coolant temperature TW and intake air temperature TA. Control is execised in accordance with $\theta MAP + \theta IGCR$ of Equation (1) to obtain optimum combustion of fuel in the engine cylinders. $\theta IGSD$ represents a second advance angle correction variable according to the present invention, the delay in the generation of the signals by the T04 sensor 12 and T24 sensor 13. $\theta IGSD$ will be described in greater detail later.

Next, the CPU 10 computes the conduction time DUTY of the primary coil 22a of the ignition coil 22. The conduction time DUTY preferably is set to a value intenged to be optimum from the standpoint of preventing both overheating of the coil and misfire of the spark plugs. In general, DUTY is obtained as a function of the engine rpm Ne.

The CPU 10 then proceeds to compute the conduction initiation timing TDUT and conduction termination timing TIG of the primary coil 22a based on the ignition advance angle $\theta IG$ and conduction time DUTY found in the manner set forth above. To accomplish this, the CPU 10 first counts back, from a TDC position [S20' in (b) of FIG. 2] immediately after the reference crank angle position of the second cylinder within which the ignition should be effected, a crank angle position [a position corresponding to instant t1 in (c) of FIG. 2] at which conduction of the primary coil 22a is to start based on the ignition advance angle $\theta IG$ and conduction time DUTY, and determines in which stage position is located the crank angle position at which conduction is to start. The CPU 10 then finds the period of time needed for this crank angle position to be attained by rotation of the crankshaft from instant t0 [(c) of FIG. 2], which is that at which the T24 signal pulse S42' in the determined stage position (the #2 stage position in the illustrated embodiment) enters the CPU 10. This period of time is the conduction initiation timing TDUT. Likewise, the CPU 10 determines in which stage position is located the crank angle position [a position corresponding to the instant t3 in (c) of FIG. 2] at which conduction of the coil 22a is to be terminated based on the ignition angle $\theta IG$. The CPU 10 then finds the period of time needed for this crank angle position to be attained by rotation of the crankshaft from instant t2, which is that at which the T24 signal pulse (S44') in the determined stage position (the #4 stage position in the illustrated embodiment) enters the CPU 10. This period of time is the conduction termination timing TIG.

The CPU 10 has internal counters (not shown) used in the process for initiating and terminating conduction of the primary coil 22a. Using the conduction initiating counter, the CPU 10 waits for the lapse of the conduction ignition time period TDUT extending from detection (instant t0) of the T24 signal pulse (S42') of the stage position at which conduction of the primary coil 22a is to start is detected, and applies a conduction control signal to the driving circuit 20 at the instant (t1) the period of time TDUT expires. Then, using the conduction terminating counter, the CPU 10 waits for the lapse of the conduction termination time period TIG extending from detection (instant t2) of the T24 signal pulse (S44') of the stage position at which conduction of the primary coil 22a is to stop, and stops applying the conduction control signal to the driving circuit 20 at the instant (t3) the period of time TIG expires.

The driving circuit 20 supplies the primary coil 22a of ignition coil 22 with coil excitation power for the period of time during which the CPU 10 supplies the driving circuit 20 with the conduction control signal. When supply of the coil excitation power is cut off from the driving circuit 20, a high voltage is produced in the secondary coil 22b of ignition coil 22 and is supplied to a spark plug (spark plug 25c in the illustrated embodiment) by the distributor 24, thereby igniting the spark plug by causing it to produce a spark discharge.

Figure 4:
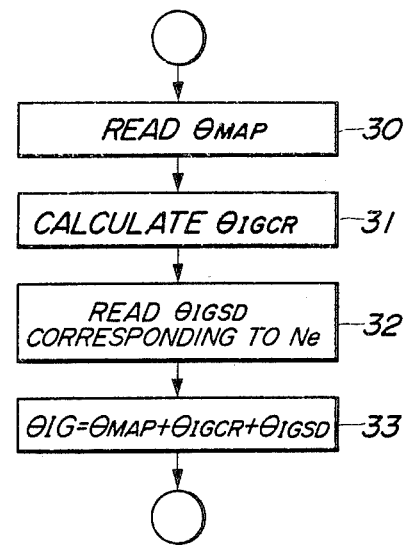
FIG. 4 is a flowchart illustrating a manner of calculating an ignition advance angle according to the present invention.

FIG. 4 is a flowchart by a procedure executed internally of the CPU 10 for calculating the ignition advance angle $\theta IG$ in accordance with the present invention.

The first step of the flowchart is a step 30, at which the CPU 10 reads the basic ignition advance angle $\theta MAP$ out of the ROM 27. This is followed by a step 31, which calls for the CPU 10 to calculate the advance angle correction variable $\theta IGCR$. The program then proceeds to a step 32, at which the CPU 10 obtains the value of the second advance angle correction variable $\theta IGSD$ conforming to the engine rotational speed Ne, which is based upon the delay characteristic of the T24 sensor, by reading same out of a table shown in FIG. 5.

Figure 5:
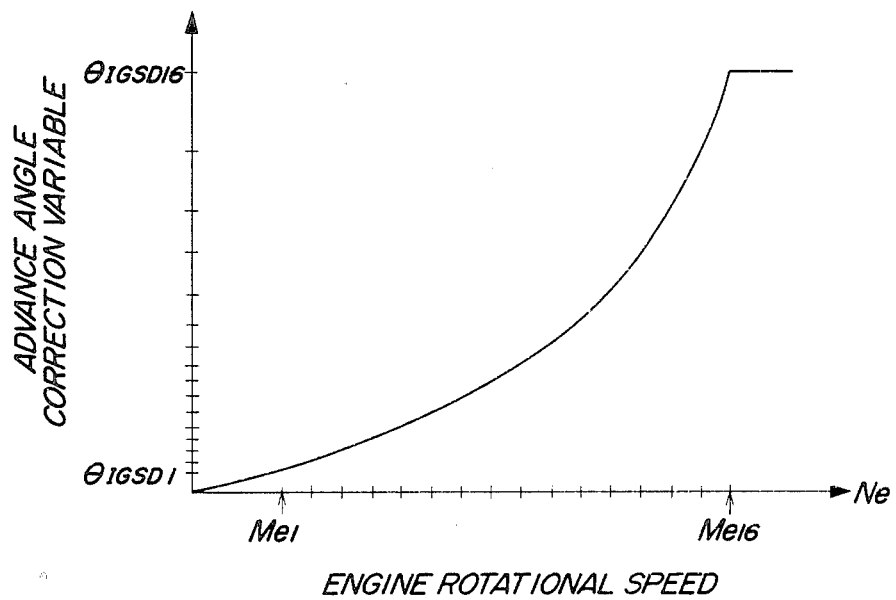
FIG. 5 is a graph showing a table indicating the relationship between a correction variable $\theta$IGSD and the rotational speed Ne of an engine.

FIG. 5 is a graph showing the table indicating the relationship between the value of the rotational speed Ne of the engine and the value of $\theta IGSD$. In actuality, the value of $\theta IGSD$ is read out of the ROM 27 in dependence upon the value of Me that corresponds to the value of Ne. The table stored in the ROM 27 comprises values of $\theta IGSD$ ranging from $\theta IGSD1$ to $\theta IGSD16$ set in correlation with values of Me ranging from Me1 to Me16, which correspond to the values of Ne shown in FIG. 5. If a sensed value of Me is not equal to any of the values Me1 through Me16, then the value of $\theta IGSD$ is calculated by a well-known interpolation method. Note that the values of $\theta IGSD$ become progressively larger to advance the ignition timing increasingly as the engine makes the transition to the high-speed region.

Returning to the flowchart of FIG. 4, the last step 33 calls for the CPU 10 to obtain the ignition timing or advance angle $\theta IG$ by adding the basic ignition advance angle $\theta MAP$, the first advance angle correction variable $\theta IGCR$ and the second advance angle correction variable $\theta IGSD$, which were obtained at the steps 30, 31 and 32, respectively. Having thus found $\theta IG$, the CPU 10 ends the present program.

As many apparently widely different embodiments of the present invention can be made without departing from the spirit and scope thereof, it is to be understood that the invention is not limited to the specific embodiments thereof.

What is claimed is:

1. An ignition timing control system for an internal combustion engine having a crankshaft, comprising:
    magnetic pick-up means for magnetically sensing the angular position of the crankshaft and for generating an output signal indictive thereof; and
    control means for controlling the ignition timing of the engine based on the output signal from said magnetic pick-up means, wherein said control means includes correction means for correcting a basic ignition timing, which is determined in accordance with at least one engine operating parameter, by the use of a correction value, which is determined in accordance with a time delay in the generation of the output signal from said magnetic pick-up means with respect to the angular position of the crankshaft and which increases with a rise in the rotational speed of the engine.

2. An ignition timing control system for an internal combustion engine having at least one cylinder and a crankshaft, comprising:
   first magnetic pick-up means for magnetically sensing a predetermined reference angular position of the crankshaft per each of the at least one cylinder for generating a first output signal indicative thereof;
   second magnetic pick-up means for magnetically sensing a plurality of angularly equally spaced predetermined angular positions of the crankshaft per each of the at least one cylinder for generating a second output signal indicative thereof; and
   control means for controlling the ignition timing of the engine based on the first and second output signals from said first and second magnetic pick-up means, wherein said control means includes correction means for correcting the ignition timing to be controlled by the control means for a time delay in the generation of at least one of the first and second output signals with respect to the angular position of the crankshaft, said time delay increasing with a rise in the rotational speed of the engine.

3. An ignition timing control system for an internal combustion engine having a crankshaft, comprising:
   magnetic pick-up means for magnetically sensing the angular position of the crankshaft and for generating an output signal indicative thereof; and
   control means for controlling the ignition timing of the engine based on the output signal from said magnetic pick-up means, wherein said control means includes correction means for correcting a basic ignition timing, which is determined in accordance with at least one engine operating parameter, by the use of a correction value, which is determined in accordance with a time delay in the generation of the output signal from said magnetic pick-up means with respect to the angular position of the crankshaft and which increases with a rise in the rotational speed of the engine, wherein said correction means includes memory means for storing a plurality of correction values corresponding respectively to values of the rotational speed of the engine for correcting the ignition timing.

4. An ignition timing control system for an internal combustion engine having at least one cylinder and a crankshaft, comprising:
   first magnetic pick-up means for magnetically sensing a predetermined reference angular position of the crankshaft per each of the at least one cylinder, and for generating a first output signal indicative thereof;
   second magnetic pick-up means for magnetically sensing a plurality of angularly equally spaced predetermined angular positions of the crankshaft per each of the at least one cylinder, and for generating a second output signal indicative thereof; and
   control means for controlling the ignition timing of the engine based on the first and second output signals from said first and second magnetic pick-up means, wherein said control means includes correction means for correcting the ignition timing to be controlled by the control means for a time delay in the generation of at least one of the first and second output signals with respect to the angular position of the crankshaft, said time delay increasing with a rise in the rotational speed of the engine, wherein said correction means includes memory means for storing a plurality of correction values corresponding respectively to values of the rotational speed of the engine for correcting the ignition timing.

5. An ignition timing control system for an internal combustion engine having a crankshaft, comprising:
   magnetic pick-up means for magnetically sensing the angular position of the crankshaft and for generating an output signal indicative thereof; and
   control means for controlling the ignition timing of the engine based on the output signal from said magnetic pick-up means, wherein said control means includes correction means for correcting a basic ignition timing, represented as a digital value which is determined in accordance with at least one engine operating parameter, by the use of a correction value, represented as a digital value which is determined in accordance with a time delay in the generation of the output signal from said magnetic pick-up means with respect to the angular position of the crankshaft and which increases with a rise in the rotational speed of the engine.

* * * * *